United States Patent
De Larminat et al.

[11] Patent Number: 6,006,074
[45] Date of Patent: *Dec. 21, 1999

[54] APPARATUS HAVING DIFFERENT SHIELDING COVERS

[75] Inventors: Alain De Larminat, Saumir; Michel Lafourcade; Bertrand Richez, both of Le Mans, all of France

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/952,157
[22] PCT Filed: Mar. 19, 1997
[86] PCT No.: PCT/IB97/00269
   § 371 Date: Nov. 14, 1997
   § 102(e) Date: Nov. 14, 1997
[87] PCT Pub. No.: WO97/35414
   PCT Pub. Date: Sep. 25, 1997

[30] Foreign Application Priority Data

Mar. 20, 1996 [FR] France ................................ 96 03452

[51] Int. Cl.⁶ .................................................. H04B 1/38
[52] U.S. Cl. .......................... 455/90; 455/351; 379/428
[58] Field of Search ................................. 312/257.1, 206, 312/208.3, 352, 293.1, 223.1, 223.2, 223.4; D14/140, 142; 455/90, 550, 127, 128, 351, 572, 575; 379/428, 435, 433

[56] References Cited

U.S. PATENT DOCUMENTS

| | | |
|---|---|---|
| 3,837,464 | 9/1974 | Baughman et al. ............ 312/208.3 X |
| 3,838,229 | 9/1974 | Morrell et al. ........................... 379/436 |
| 4,179,591 | 12/1979 | Becker .................................... 379/440 |
| 4,325,142 | 4/1982 | Nakazawa ............................... 455/575 |
| 4,396,238 | 8/1983 | Torruella ................................. 312/206 |
| 4,935,745 | 6/1990 | Mori et al. ......................... 455/575 X |
| 5,615,250 | 3/1997 | Kobayashi ........................... 455/90 X |
| 5,642,404 | 6/1997 | Hsu ..................................... 455/90 X |
| 5,649,306 | 7/1997 | Vannatta et al. ..................... 455/90 X |
| 5,731,964 | 3/1998 | Kitakubo et al. .................... 455/90 X |
| 5,809,403 | 9/1998 | MacDonald, Jr. et al. .............. 455/90 |

FOREIGN PATENT DOCUMENTS

| | | |
|---|---|---|
| 0351863A2 | 1/1990 | European Pat. Off. . |
| 0371708A2 | 6/1990 | European Pat. Off. . |
| 9403890 | 8/1995 | Germany . |
| 268315 | 11/1988 | Japan ................................... 455/128 |
| 2293517 | 3/1996 | United Kingdom . |
| 9317513 | 9/1993 | WIPO . |

Primary Examiner—Peter R. Brown
Assistant Examiner—James O. Hansen
Attorney, Agent, or Firm—Dicran Halajian

[57] ABSTRACT

This apparatus having different shielding covers comprises a functional chassis (1), a removable element (14) and at least a shielding element (12) for covering said chassis on at least its front, back and lateral surfaces. One of the shielding elements (12) coming on one of the surfaces is designed to comprise a lateral shielding part (21).

8 Claims, 4 Drawing Sheets

APPARATUS HAVING DIFFERENT SHIELDING COVERS

FIELD OF THE INVENTION

The invention relates to an apparatus having different shielding covers, comprising a functional chassis, a removable element and at least a shielding element for covering said chassis on at least its front, back and lateral surfaces.

Such an invention more particularly relates to any apparatus to which the manufacturer wishes to give different aspects. In this manner, the customers are offered products of various shapes, whereas the function actually remains identical. Of course, this variety of shape must not lead to too high manufacturing costs. Thus, one starts from a functional chassis comprising all the circuits which make it possible for the apparatus to operate and thus be tested. Then, this chassis is shielded according to the customer's wishes.

BACKGROUND OF THE INVENTION

An apparatus of this type is described in European Patent document no. EP 0 371 708.

However, this apparatus does not comprise a removable part. That which is understood to be a removable part is, for example, a power supply device formed by a set of accumulators. As these power supply devices are to be taken apart during the useful life of the apparatus, one does not wish them to have different aspects. They have even been sought to be more or less standardized, so that they can be adapted to the largest possible variety of apparatus.

SUMMARY OF THE INVENTION

For solving this shielding problem of a substantially standard apparatus comprising a removable part, the invention proposes an apparatus of the type mentioned in the opening paragraph which is characterized in that one of the shielding elements resting on one of the surfaces has side shields.

The idea of the invention is based on the fact that with these side shields it is possible to conceal the side of the removable part which often has a trite form. One thus obtains a more complete shielding of the apparatus.

These and other aspects of the invention will be apparent from and elucidated with reference to the embodiments described hereinafter.

DESCRIPTION OF PREFERRED EMBODIMENTS

Figure 1:
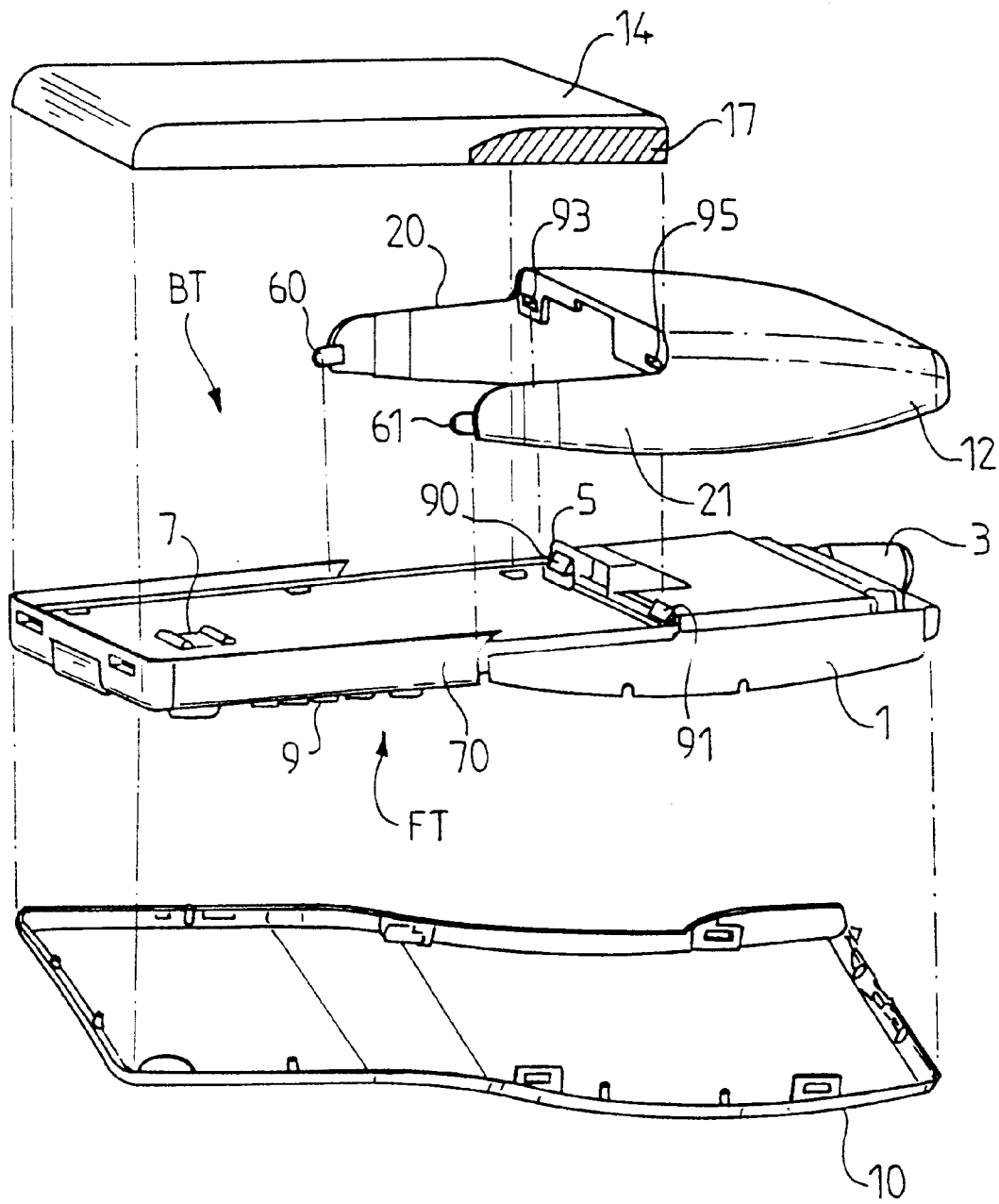
FIG. 1 shows an exploded view of an apparatus in accordance with the invention.

Within the scope of the example described, the apparatus shown in FIG. 1 is a wireless radio telephone for the GSM system. It is formed by a functional chassis 1 comprising all the elements of such a telephone: a screen, a microphone, a loudspeaker (not shown in FIG. 1), an antenna 3, an accumulator connector 5 for its power supply, a connector 7 for receiving a SIM card which defines the operation of the telephone, a keypad 9. Once power has been supplied, said chassis operates with all the functionalities provided therein which thus permits to test it before it is shielded. The apparatus can be shielded by a first shielding element 10 which comes on the front surface FT of the chassis and by a second shielding element 12 which comes on a part of the back surface BT of the chassis 1. A removable part 14 which is the accumulator block of the apparatus also comes on the back surface BT.

According to the invention, the second shielding part 12 comprises side shields formed by two wings 20 and 21.

These wings conceal the corresponding side parts of the block 14. The concealed part 17 of the block 14 is represented in hatched form.

Figure 2A:
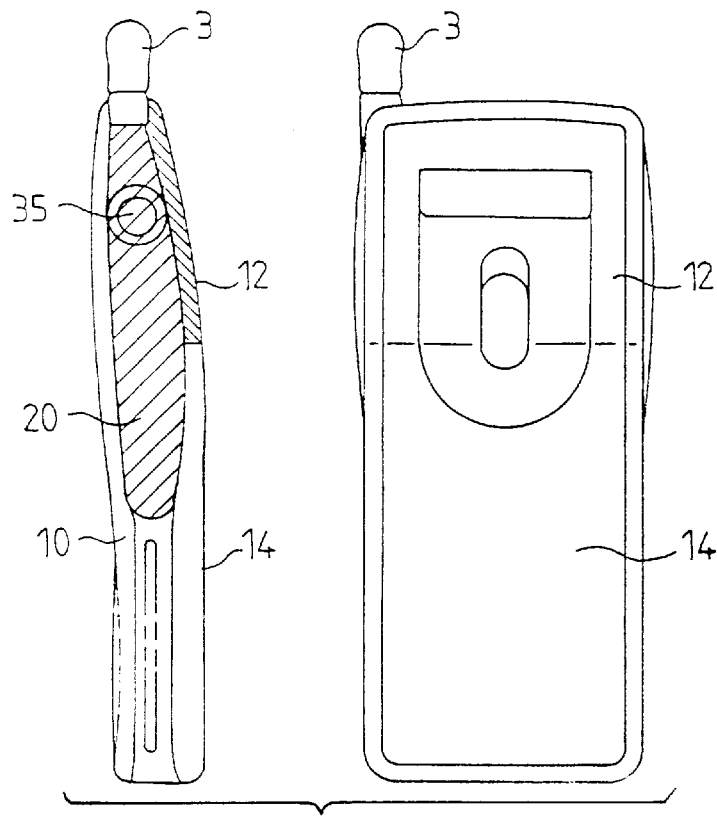
FIGS. 2A and 2B show the side shields, showing beside them the back surface and the front surface of an apparatus according to the invention.
Figure 2B:
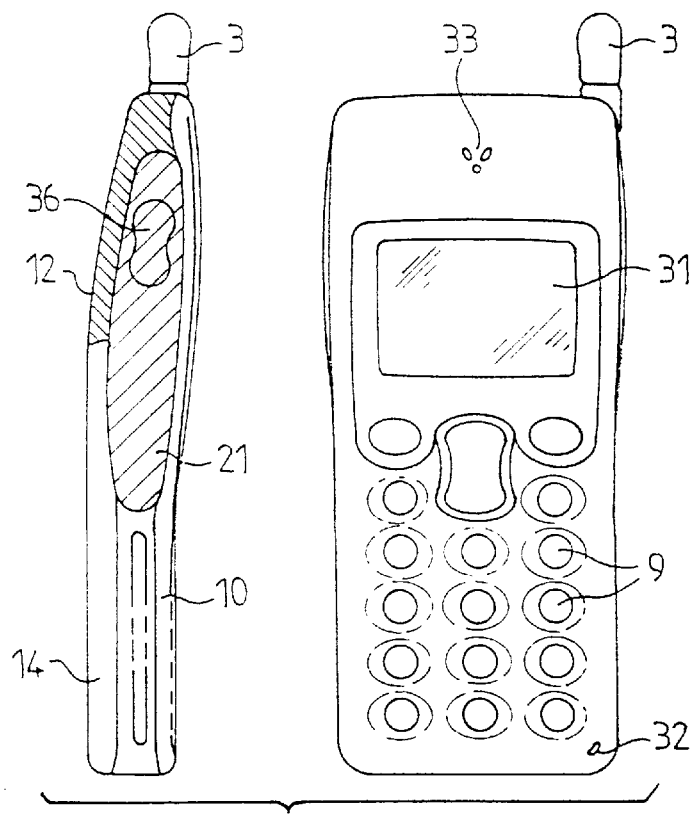

FIG. 2 shows in A one of these wings in an elevational view with the back surface of the apparatus beside it and in B the other one of these wings with the front surface beside it. In this FIG. 2, the elements which are in common with the preceding Figure carry like references. In B is distinguished the screen 31, the microphone 32 and the loudspeaker 33. It will be noted that the wings may have different aspects. Thus the wing 20 has a push button 35 whereas wing 21 has a double button 36.

Figure 3:
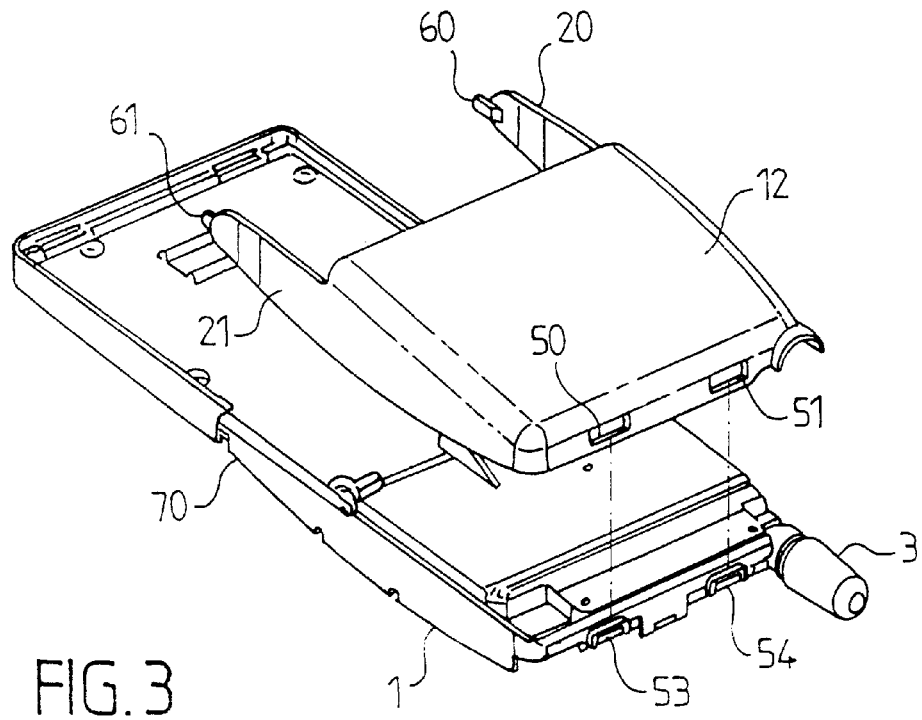
FIG. 3 shows fastening means for a shielding element which has side shields whose length partly extend along the housing of the removable element.
Figure 4:
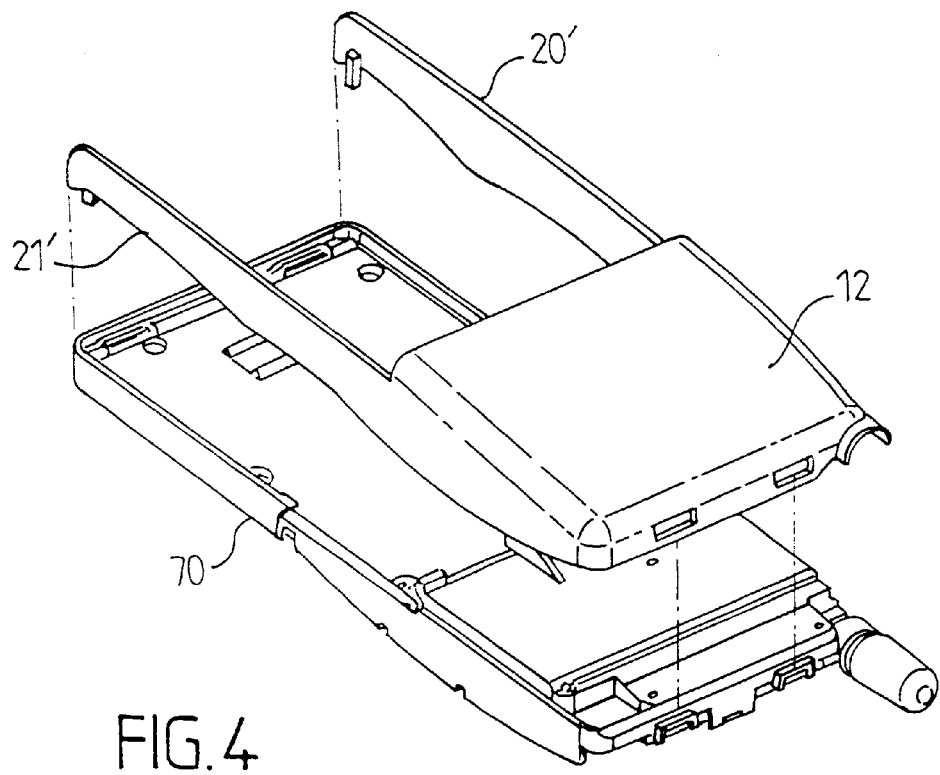
FIG. 4 shows a shielding element presenting side shields whose length extend along the whole housing of the removable element.

The FIGS. 3 and 4 show that the wings may have different lengths. In FIG. 3, the wings 20 and 21 have a length which is smaller than that of the housing of the removable element 14. In FIG. 4 the wings 20' and 21' have a length equal to that of said housing.

Figure 5:
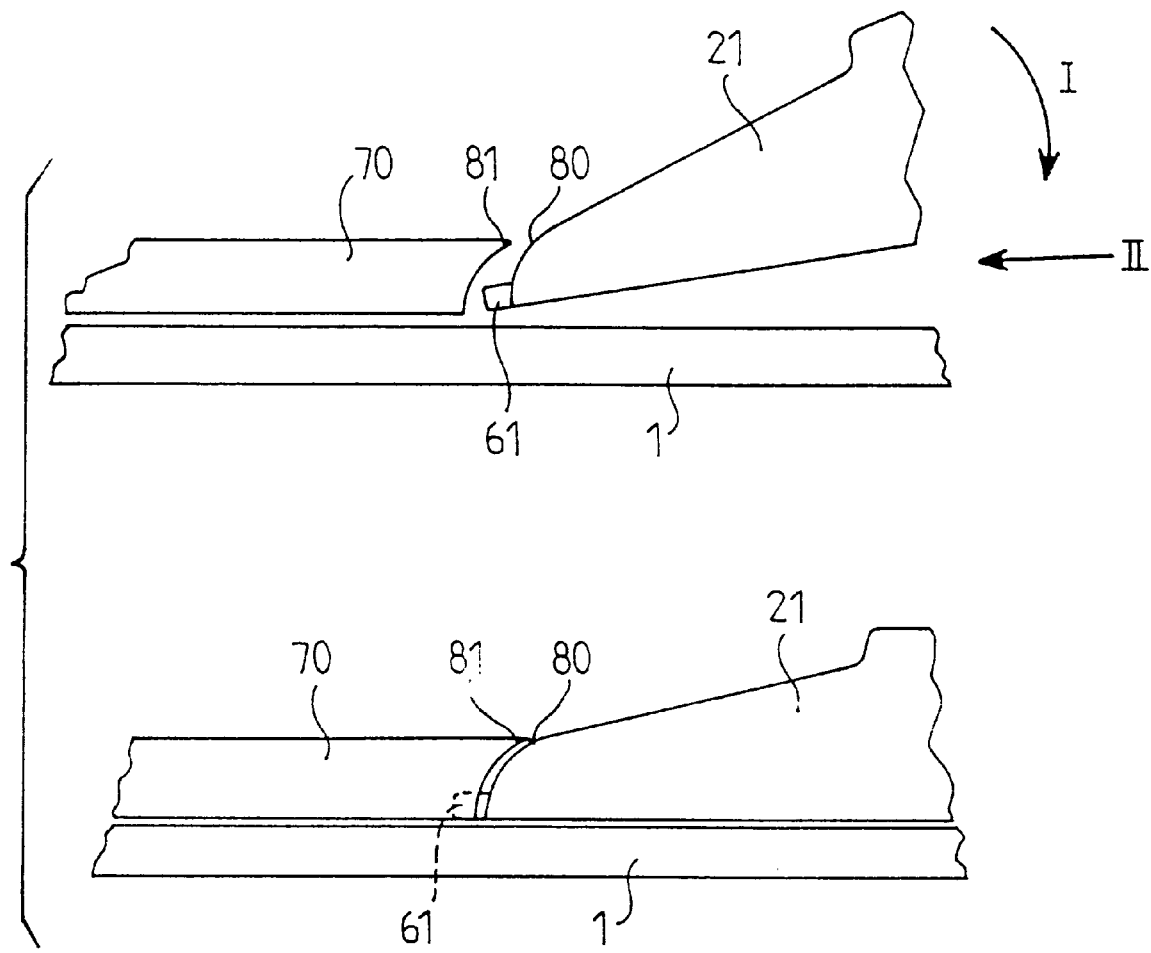
FIG. 5 shows how the fastening works of the shielding element which has side shields on the functional chassis.

FIG. 3 partly shows the fastening of the shielding element 12. This element has two holes 50 and 51 with which the protrusions 53 and 54 provided on the chassis 1 are to engage. This fastening is also ensured by two thin plates 60 and 61 integral with the wings 20 and 21 respectively, which are to engage on the inside with a side wall 70 which forms part of the chassis 1. This is better shown in FIG. 1. FIG. 5 shows in more detail the locking of the thin plate 61 in the wall 70. The plate 60 simultaneously locks in the same manner. It will be observed that the wing 21 (as well as wing 20, not shown in the Figure) comprises a convex-rounded part 80 whose radius of curvature is the same as that of a rounded part 81 which is concave and provided in the wall 70. Thus, by a turning movement I and a push II, the part 12 is positioned on the chassis 1 when the plates 60 and 61 have engaged with the wall 70 on the inside. During this movement, cradles 90 and 91 lock on to rings 93 and 95 (see FIG. 1) and, finally, the fastening is completed by the engagement of the protrusions 53 and 54 with the openings 50 and 51 (FIG. 3).

It should be noted that the side shields provide a certain hold of the removable part and also a certain protection while permitting the use of a compact functional chassis reduced to essentials.

We claim:

1. A portable telephone comprising:
   a housing which houses electrical components;
   a power supply which is removably attached to said housing for providing power to said electrical components, said power supply having a supply cover which covers said power supply; and
   a housing cover having a cover body and side walls, wherein said cover body covers a first portion of said housing, said side walls having extended parts which extend away from said body toward a second part of said housing which is not covered by said cover body, wherein said extended parts conceal side parts of said power supply and define an opening for receiving said power supply and wherein said power supply is not attached to said housing cover.

2. The portable telephone of claim 1, wherein said side walls protect said power supply while attached to said housing.

3. The portable telephone of claim 1, wherein each of said side walls has a convex edge which is attachable to a concave surface of a side of said housing.

4. The portable telephone of claim 1, wherein said housing cover is removably attached to said housing.

5. An apparatus comprising:

a housing which houses electrical components;

a power supply which is removably attached to said housing for providing power to said electrical components, said power supply having a supply cover which covers said power supply; and a housing cover having a cover body and side walls, wherein said cover body covers a first portion of said housing, said side walls having extended parts which extend away from said body toward a second part of said housing which is not covered by said cover body, wherein said extended parts conceal side parts of said power supply and define an opening for receiving said power supply and wherein said power supply is not attached to said housing cover.

6. The apparatus of claim 5, wherein said side walls protect said power supply while attached to said housing.

7. The apparatus of claim 5, wherein each of said side walls has a convex edge which is attachable to a concave surface of a side of said housing.

8. The apparatus of claim 5, wherein said housing cover is removably attached to said housing.

* * * * *